(12) United States Patent
Kosaka et al.

(10) Patent No.: US 8,899,642 B2
(45) Date of Patent: Dec. 2, 2014

(54) BUMPER-STAY MOUNTING STRUCTURE AND LOAD TRANSMISSION MEMBER

(75) Inventors: Hiroyasu Kosaka, Toyota (JP); Takeshi Taniguchi, Toyota (JP); Mitsutoshi Kano, Toyota (JP); Shimpei Urata, Miyagi (JP); Takashi Niiya, Toyoake (JP)

(73) Assignees: Toyoda Iron Works Co., Ltd., Toyota-shi, Aichi-ken (JP); Toyota Jidosha Kabushiki Kaisha, Toyota-shi, Aichi (JP); Toyota Motor East Japan, Inc., Kurokawa-gun, Miyagi (JP)

( * ) Notice: Subject to any disclaimer, the term of this patent is extended or adjusted under 35 U.S.C. 154(b) by 0 days.

(21) Appl. No.: 13/880,987

(22) PCT Filed: Dec. 24, 2011

(86) PCT No.: PCT/JP2011/079951
§ 371 (c)(1),
(2), (4) Date: Apr. 23, 2013

(87) PCT Pub. No.: WO2012/140809
PCT Pub. Date: Oct. 18, 2012

(65) Prior Publication Data
US 2014/0021729 A1    Jan. 23, 2014

(30) Foreign Application Priority Data

Apr. 14, 2011   (JP) .................... 2011-090471

(51) Int. Cl.
*B60R 19/26*   (2006.01)
*B60R 19/34*   (2006.01)
*B60R 19/24*   (2006.01)

(52) U.S. Cl.
CPC .......... *B60R 19/34* (2013.01); *B60R 2019/247* (2013.01); *B60R 19/26* (2013.01)
USPC .......................................... 293/133; 293/155

(58) Field of Classification Search
CPC ...... B60R 19/26; B60R 19/28; B60R 19/285; B60R 19/30; B60R 19/34; B60R 19/36; B62D 21/15; B62D 21/152; B62D 21/155
USPC ............... 293/133, 155, 132, 13; 296/187.03, 296/187.09, 187.11
See application file for complete search history.

(56) References Cited

U.S. PATENT DOCUMENTS 5,005,887 A * 4/1991 Kelman .................... 293/120
6,926,327 B2 * 8/2005 Shibata .................... 293/155

(Continued)

FOREIGN PATENT DOCUMENTS

JP   2007-245875       9/2007
JP   2010-83455    *   4/2010   ............. B62D 25/20

*Primary Examiner* — Gregory Blankenship
(74) *Attorney, Agent, or Firm* — Finnegan, Henderson, Farabow, Garrett & Dunner, LLP (57) ABSTRACT

A bumper-stay mounting structure includes a rear side member, a bumper stay and a load transmission member, in the bumper-stay mounting structure, a load being transmitted intensively to a lower side of a rear end portion of the rear side member, the bumper-stay mounting structure, the load transmission member having, on an inner peripheral side of a fastened portion, a protruding portion in a box shape, which protrudes toward the rear portion of the bumper stay in the vehicle longitudinal direction so as to be inserted into an opening of the bumper stay; and a side wall of the protruding portion having a substantially U-shaped cross section that is perpendicular to the vehicle longitudinal direction, is opened on a vehicle upper side, and is provided with, at a front end edge of the side wall, a flange extending outward from a side wall as the fastened portion.

4 Claims, 4 Drawing Sheets

(56) References Cited

U.S. PATENT DOCUMENTS

| | | | |
|---|---|---|---|
| 7,188,877 B2 * | 3/2007 | Gonzalez et al. | 293/133 |
| 7,533,913 B2 * | 5/2009 | Bae | 293/133 |
| 8,002,338 B2 * | 8/2011 | Yasuhara et al. | 296/203.02 |
| 8,123,265 B2 * | 2/2012 | Nilsson | 293/155 |
| 8,430,437 B2 * | 4/2013 | Asakawa et al. | 293/133 |
| 8,469,416 B2 * | 6/2013 | Haneda et al. | 293/133 |
| 2008/0116719 A1 * | 5/2008 | Bae | 296/187.09 |
| 2013/0207417 A1 * | 8/2013 | Kihara et al. | 296/187.09 |
| 2014/0021729 A1 * | 1/2014 | Kosaka et al. | 293/133 |

* cited by examiner

VEHICLE UPWARD
VEHICLE REARWARD

BUMPER-STAY MOUNTING STRUCTURE AND LOAD TRANSMISSION MEMBER

CROSS-REFERENCE TO RELATED APPLICATIONS

This application is a national phase application of International Application No. PCT/JP2011/079951, filed Dec. 24, 2011, the content of which is incorporated herein by reference.

TECHNICAL FIELD

The present invention relates to a bumper-stay mounting structure, and more specifically to a mounting structure with which a load, input into a bumper stay from a bumper reinforcement, is appropriately transmitted to a lower side of a rear end portion of a rear side member.

BACKGROUND ART

There has been known a bumper-stay mounting structure including: (a) a rear side member that is disposed along a longitudinal direction of a vehicle and that is deformed in its axial direction due to application of a load to its rear end portion at the time of rear end collision of the vehicle, thereby absorbing impact; (b) a bumper stay that is formed in a bottomed box shape, that has a bottom portion which is located in a rear portion of the bumper stay in the longitudinal direction of the vehicle and to which a bumper reinforcement is attached, and that is provided with, at an outer edge portion of an opening formed in a front portion of the bumper stay in the longitudinal direction of the vehicle that is opposite to the bottom portion, a pair of side flanges respectively extending outward to the left and the right from a pair of right and left side walls located on respective sides in a vehicle width direction and a lower flange extending downward from a lower side wall in a lower portion of the bumper stay in the height direction of the vehicle; and (c) a load transmission member that is disposed between the rear end portion of the rear side member and the bumper stay, that has a flat fastened portion that is fastened between the pair of side flanges and the lower flange of the bumper stay, and the rear end portion of the rear side member, and that transmits, to the rear side member via the fastened portion, a load input into the bumper stay from the bumper reinforcement at the time of the rear end collision of the vehicle.

Figure 6:
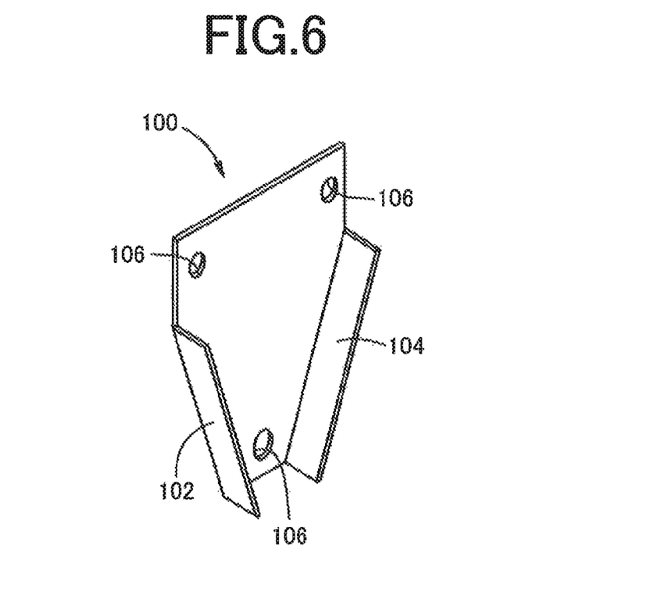
FIG. 6 is a perspective view illustrating one example of the conventional load transmission member.

A mounting structure as described in Patent Document 1 is one example thereof, and used in a case where there is performed the mounting of the bumper stay on a rear side member that has a bottom portion and a pair of side walls extending upward respectively from side portions of the bottom portion so as to form a substantially U-shaped cross section. In the mounting structure, (a) a rear end portion of the rear side member is provided with a pair of side flanges extending outward in a lateral direction of a vehicle respectively from the pair of side walls, and a lower flange extending downward from the bottom portion, and (b) the fastened portion of the load transmission member is configured to be fastened between the pair of side flanges and the lower flange of the bumper stay, and the pair of side flanges and the lower flange provided at the rear end portion of the rear side member. Further, as the load transmission member, an intermediate plate 100 provided with a pair of flanges 102, 104 to increase stiffness of a lower portion, as illustrated in FIG. 6, is employed, and the intermediate plate 100 is configured to be integrally fixed, together with the bumper stay, to the pair of side flanges and the lower flange of the rear side member with bolts or the like via three mounting holes 106. With this configuration, a load is transmitted to a lower side of the rear end portion of the rear side member, and it is expected that while the rear side member is deformed in a predetermined deformation form, a predetermined impact-absorption effect is obtained by the deformation.

RELATED ART DOCUMENT

Patent Document

Patent Document 1: Japanese Patent Application Publication No. 2007-245875

SUMMARY OF THE INVENTION

Problem to be Solved by the Invention

However, in such a conventional bumper-stay mounting structure, since a flat intermediate plate has been used as a load transmission member, the stiffness of a lower side is increased by flanges, but there has been room for improvement in terms of reliably obtaining a desired state of load transmission to a rear side member.

The present invention has been made in view of the above circumstances as a background, and an object of the present invention is to more reliably obtain a desired load transmission state by causing a load, input into a bumper stay from a bumper reinforcement, to be transmitted intensively to a lower side of a rear end portion of a rear side member via a load transmission member.

Means for Solving the Problem

To achieve the object, the first invention provides a bumper-stay mounting structure, comprising: (a) a rear side member that is disposed along a longitudinal direction of a vehicle and that absorbs an impact at a time of rear end collision of the vehicle by being deformed in an axial direction due to application of a load to a rear end portion thereof (b) a bumper stay that is formed in a bottomed box shape, that has a bottom portion which is located in a rear portion of the bumper stay in the longitudinal direction of the vehicle and to which a bumper reinforcement is attached, and that is provided with, at an outer edge portion of an opening formed in a front portion of the bumper stay in the longitudinal direction of the vehicle opposite to the bottom portion, a pair of side flanges extending outward to a left and a right respectively from a pair of right and left side walls located on both sides in a vehicle width direction and a lower flange extending downward from a lower side wall in a lower portion of the bumper stay in the height direction of the vehicle; and (c) a load transmission member that is disposed between the rear end portion of the rear side member and the bumper stay, that has a flat fastened portion fastened between the pair of side flanges and the lower flange of the bumper stay and the rear end portion of the rear side member, and that transmits, to the rear side member via the fastened portion, a load input into the bumper stay from the bumper reinforcement at the time of the rear end collision of the vehicle, (d) in the bumper-stay mounting structure, a load being transmitted intensively to a lower side of the rear end portion of the rear side member, the bumper-stay mounting structure, characterized in that: (e) the load transmission member has, on an inner peripheral side of the fastened portion, a protruding portion in a box shape, which protrudes toward the rear portion of the bumper stay in the longitudinal direction of the vehicle so as to be inserted into the opening of the bumper stay; and (f) a side wall of the protruding portion has a substantially U-shaped cross section that is perpendicular to the longitudinal direction of the vehicle, is opened on a vehicle upper side, and is provided with, at a front end edge of the side wall, a flange extending outward from the side wall as the fastened portion.

The second invention provides the bumper-stay mounting structure recited in the first invention, wherein the protruding portion has a distal end face substantially parallel to the bottom portion of the bumper stay, a predetermined space is provided between the bottom portion and the distal end face, so that the bumper stay is deformed with a relatively low load from the bottom portion side in an early stage of the rear end collision of the vehicle, and then a transmission load is increased when the protruding portion is deformed together with the bumper stay.

The third invention provides the bumper-stay mounting structure recited in the first or second invention, wherein (a) the rear side member has a bottom portion and a pair of side walls extending upward respectively from both side portions of the bottom portion so as to form a substantially U-shaped cross section; (b) the rear end portion of the rear side member is provided with a pair of side flanges extending outward respectively from the pair of side walls in a lateral direction of the vehicle, and a lower flange extending downward from the bottom portion; and (c) the flange of the load transmission member is fastened between the pair of side flanges and the lower flange of the bumper stay and the pair of side flanges and the lower flange provided at the rear end portion of the rear side member.

The fourth invention provides a load transmission member used in the bumper-stay mounting structure according to any one of the first to third inventions.

Effect of the Invention

In such a bumper-stay mounting structure, the protruding portion in the box shape, which sticks out toward the rear portion of the bumper stay in the longitudinal direction of the vehicle, is formed in the load transmission member so as to be inserted in the opening of the bumper stay, and therefore, stiffness of the load transmission member itself increases in a load application direction (the longitudinal direction of the vehicle), and the protruding portion is also deformed when the bumper stay is deformed at the time of rear end collision of the vehicle. Therefore, a transmission load is increased by its deformation resistance. Thus, a large load is reliably transmitted to the rear side member via the load transmission member at the time of rear end collision of the vehicle, and an impact absorption effect due to the deformation of the rear side member is obtained appropriately. Further, since the side wall of the protruding portion of the load transmission member has a U-shaped cross section and is opened on the vehicle upper side, the stiffness on the lower side where the continuous side wall is provided is increased in particular. Therefore, a load is transmitted intensively to the lower side of the rear end portion of the rear side member, and consequently a desired load transmission state to the rear side member is obtained further reliably.

In the second invention, a predetermined space is provided between the distal end face of the protruding portion and the bottom portion of the bumper stay, so that the bumper stay is deformed with a relatively low load from the bottom portion side in an early stage of the rear end collision of the vehicle, and then a transmission load is increased when the protruding portion is deformed together with the bumper stay. Accordingly, impact is absorbed appropriately by the deformation of the bumper stay for a low load input at the time of low-speed collision or the like, whereas a high load is transmitted appropriately to the rear side member due to deformation resistance of the bumper stay and the protruding portion for a high load input at the time of high-speed collision or the like. Thus, impact is absorbed appropriately due to the deformation of the bumper stay, the protruding portion, and the rear side member.

The third invention is a case where the rear side member having a U-shaped cross section is used. The rear end portion of the rear side member is provided with a pair of side flanges and a lower flange; and the flange (fastened portion) of the load transmission member is fastened between the pair of side flanges and the lower flange of the bumper stay and the pair of side flanges and the lower flange provided at the rear end portion of the rear side member to be fixed integrally. As described above, the pair of side flanges and the lower flange are provided at the rear side member, and the bumper stay is fixed to those flanges via the load transmission member. As a result, a load is transmitted intensively to the lower side of the rear end portion of the rear side member, and thus, a desired load transmission state is obtained further reliably.

The fourth invention provides a load transmission member used in the bumper-stay mounting structure according to any one of the first to third inventions, and which can substantially obtain the same actions and effects as the first to third inventions.

MODES FOR CARRYING OUT THE INVENTION

A bumper-stay mounting structure according to the present invention is used to mount a bumper stay of a bumper, mounted on a rear side of a vehicle, on a rear end portion of a rear side member. It is preferable to apply the bumper-stay mounting structure to both of a pair of mounting structures generally provided on the right and left sides of the vehicle, but the bumper-stay mounting structure may be applied to only either one of the right and left mounting structures.

The rear side member disposed along a longitudinal direction of the vehicle is configured such that a load is transmitted intensively to a lower side of its rear end portion from a load transmission member at the time of rear end collision of the vehicle and thus, for example, an intermediate portion is buckled and bent in a chevron shape (L-shape) to stick out toward a vehicle upper side, thereby absorbing impact. A rear side member that has a bottom portion and a pair of side walls extending upward respectively from both sides of the bottom portion, and that is in a substantially U-shape in cross section, that is, cross section perpendicular to the longitudinal direction of the vehicle, as described in the third invention, is preferably used. However, various other alternatives such as a quadrangular closed tubular rear side member may be also used. The U-shape does not necessarily have a curved shape such as an arc on its bottom side, and may be in a rectangular shape so that side walls on both sides extend upward substantially perpendicularly to a substantially flat bottom portion. The same can apply to a U-shape regarding a side wall of a protruding portion of the load transmission member.

A bumper stay having a bottomed box shape is also configured such that a load is transmitted thereto from a bumper reinforcement at the time of rear end collision of the vehicle, and, thus, the bumper stay is crushed or buckled in a bellows manner, for example, from a bottom side to which the bumper reinforcement is fixed, thereby absorbing impact. A pair of side flanges and a lower flange provided at an outer edge portion of an opening of this bumper stay may be formed so as to be contiguous with each other in a circumferential direction of the outer edge portion of the opening, but may be formed so as to be separated from each other in the circumferential direction of the outer edge portion of the opening. The same can apply to a pair of side flanges and a lower flange provided at the rear end portion of the rear side member in the third invention and flanges provided so as to extend outward from a front end edge of the side wall of the protruding portion. These flanges are formed so as to be contiguous and integrated with the side walls or the like, for example, by subjecting a metal plate material such as a steel plate to bending, drawing, or the like, but may be configured as separated portions and fixedly provided so as to be integrated with the side walls or the like by welding or the like.

The protruding portion formed in the load transmission member is configured so that its side wall is brought into tight contact with, for example, inner faces of a pair of right and left side walls and a lower side wall of the bumper stay in the bottomed box shape, but a gap (space) may be provided between the side wall of the protruding portion and these inner faces. In a case where the side wall of the protruding portion is brought into tight contact with the inner faces of the bumper stay, the load transmission member and the bumper stay are reinforced by each other and their deformation is suppressed, so that a larger load is transmitted to the rear side member. The protruding portion may be formed in a box shape, for example, by bending a metal plate material such as a steel plate, or may be formed through integral forming by subjecting a flat metal plate material to drawing or the like such that inner sides of flanges that function as a fastened portion are smoothly bulged.

In the second invention, a predetermined space is provided between a distal end face of the protruding portion and the bottom portion of the bumper stay, but in implementation of the first invention, a protruding portion having a distal end face that reaches the bottom portion of the bumper stay may be formed. The predetermined space in the second invention, that is, a distance between the distal end face of the protruding portion and the bottom portion of the bumper stay is determined appropriately such that a desired load-displacement (compression stroke) characteristic is obtained.

EMBODIMENT

Hereafter, an embodiment of the present invention will be described in detail with reference to the drawings.

Figure 1:
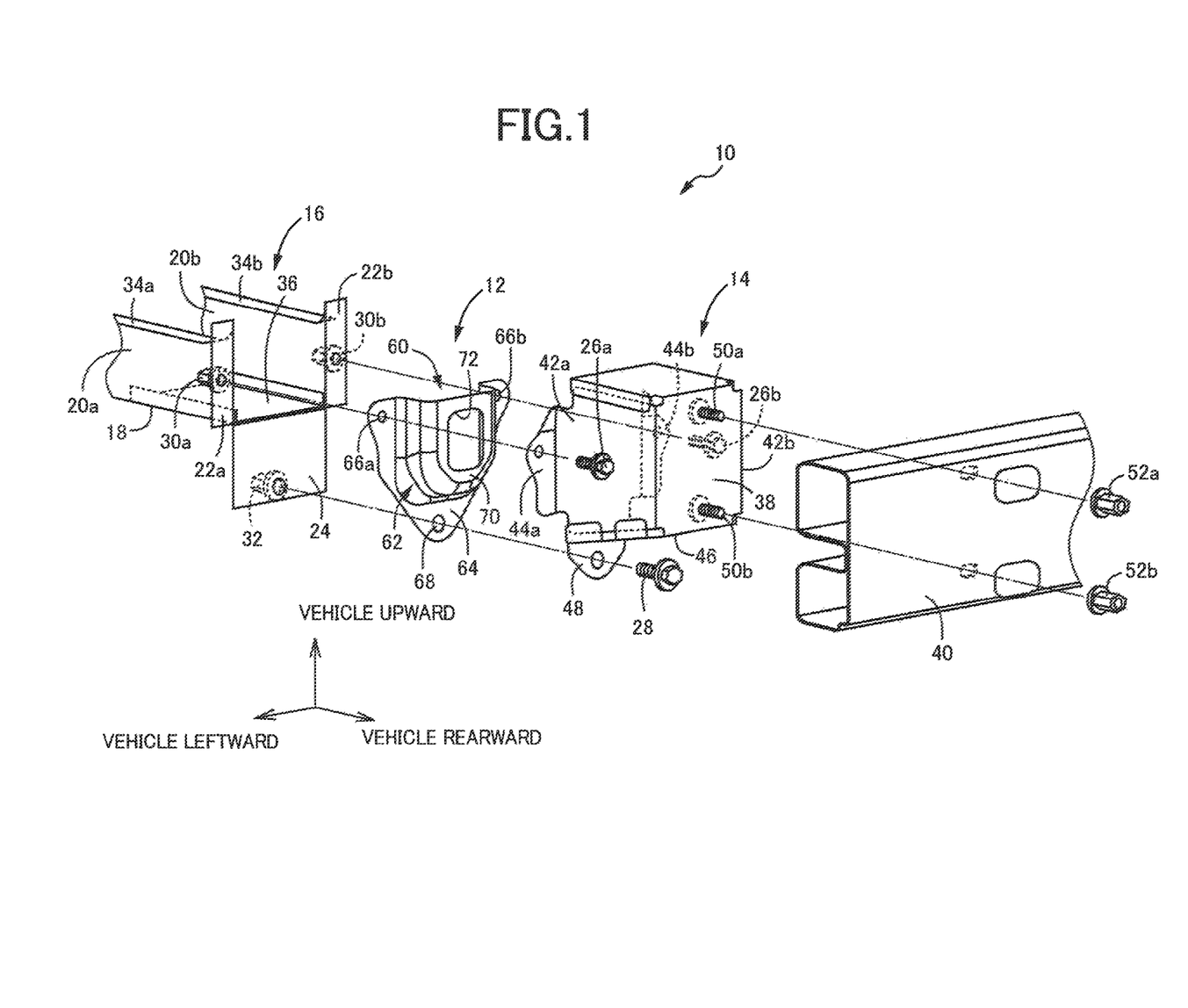
FIG. 1 is an exploded perspective view of a bumper-stay mounting structure, which is one embodiment of the present invention.
Figure 2:
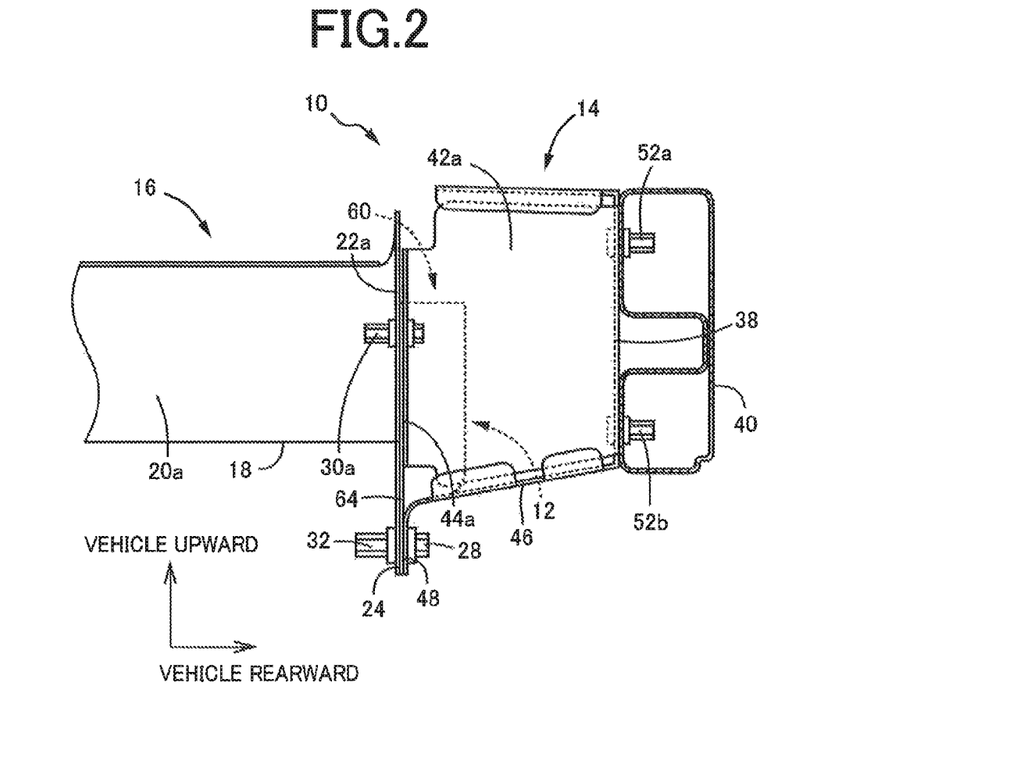
FIG. 2 is a side view of an assembled state of the bumper-stay mounting structure of FIG. 1.
Figure 3:
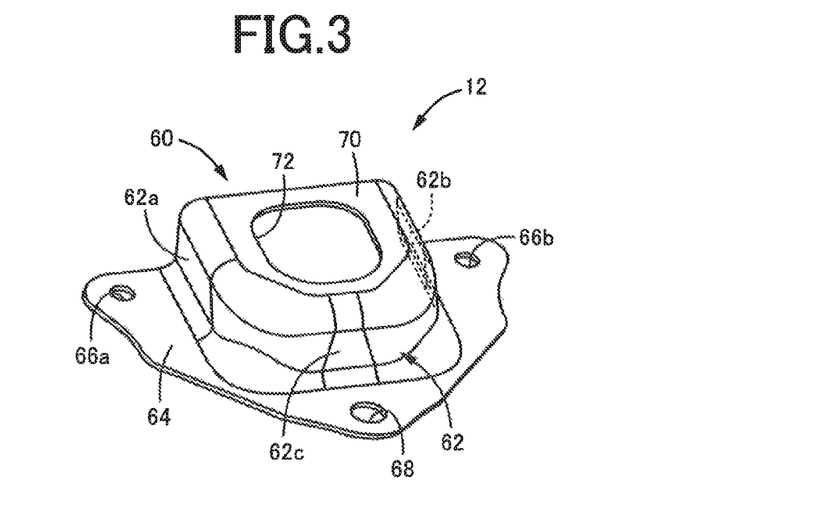
FIG. 3 is a perspective view illustrating only a load transmission member of FIG. 1.

FIG. 1 is an exploded perspective view of a bumper-stay mounting structure 10, which is one embodiment of the present invention, FIG. 2 is a side view of an assembled state of the bumper-stay mounting structure 10, and FIG. 3 is a perspective view illustrating only a load transmission member 12 of the bumper-stay mounting structure 10. This bumper-stay mounting structure 10 is used to mount a bumper stay 14 of a bumper, mounted on a rear side of a vehicle, on the rear end portion of a rear side member 16, and relates to a mounting structure on a left side of the vehicle. However, a mounting structure on a right side of the vehicle is also configured in the same manner.

The rear side member 16 is a long member disposed along a longitudinal direction of the vehicle, and is configured such that due to application of a load to its rear end portion at the time of rear end collision of the vehicle, the rear side member 16 is deformed in its axial direction (for example, crushed or buckled in a bellows manner), thereby absorbing impact. The rear side member 16 includes a bottom portion 18 and a pair of side walls 20a, 20b extending upward respectively from both sides of the bottom portion 18, and its cross section perpendicular to the longitudinal direction of the vehicle forms a rectangular U-shape. Further, the rear end portion in a rear portion of the bumper stay in the longitudinal direction of the vehicle is provided with a pair of side flanges 22a, 22b extending outward in a lateral direction of the vehicle respectively from the pair of side walls 20a, 20b, and a lower flange 24 extending downward from the bottom portion 18. Further, those flanges 22a, 22b, 24 have through-holes through which bolts 26a, 26b, 28 are passed respectively, and nut members 30a, 30b, 32 are integrally fixed on portions around the through-holes on the opposite side to a side into which bolts are inserted (front portions of the bumper stay in the longitudinal direction of the vehicle) of the respective through-holes by welding or the like so that the bumper stay 14 is integrally fixed to the flanges 22a, 22b, 24 by those bolts 26a, 26b, 28.

The rear side member 16 is formed by bending a metal plate material such as a steel plate, and has the pair of side walls 20a, 20b formed by bending part of the metal plate material upward substantially perpendicularly to the flat bottom portion 18. The flanges 22a, 22b, 24 are also formed by bending, and are formed so as to be contiguous and integrated with the side walls 20a, 20b and the bottom portion 18. In the rear side member 16, flanges 34a, 34b, each of which is bent so as to extend substantially horizontally outward in a width direction of the vehicle, are formed integrally with upper edges of the pair of side walls 20a, 20b, and, in addition, a reinforcing member 36 is integrally fixed by welding or the like to the inner side of the bottom portion 18 over a predetermined length dimension from the rear end portion. This reinforcing member 36 is provided appropriately as needed.

The bumper stay 14 is formed in a quadrangular bottomed box shape, has a bottom portion 38 which is located in a rear portion of the bumper stay in the longitudinal direction of the vehicle and to which a bumper reinforcement 40 is attached, and is provided with, at an outer edge portion of an opening formed in a front portion of the bumper stay in the longitudinal direction of the vehicle opposite to the bottom portion 38, a pair of side flanges 44a, 44b extending outward respectively to the left and the right from a pair of right and left side walls 42a, 42b located on respective sides in the width direction of the vehicle and a lower flange 48 extending downward from a lower side wall 46 in a lower portion of the bumper stay in the height direction of the vehicle. The bottom portion 38 is provided in such a posture that the bottom portion 38 is substantially perpendicular to the longitudinal direction of the vehicle, and, in addition, a pair of bolts 50a, 50b is fixed integrally with the bottom portion 38 by welding or the like so as to be apart from each other in an up-down direction and so as to stick out toward the vehicle rear portion of the bumper stay in the longitudinal direction of the vehicle. The bumper reinforcement 40 is integrally fixed to an outer face of the bottom portion 38 in a tight contact state by screwing nut members 52a, 52b to those bolts 50a, 50b, respectively. An absorber (not shown) is attached to this bumper reinforcement 40 by a clip or the like.

The bumper stay 14 is formed by bending a metal plate material such as a steel plate, and four ridgeline portions extending in the longitudinal direction of the vehicle are integrally fixed to each other by arc welding, spot welding, or the like so that a bottomed box shape is formed. The flanges 44a, 44b, 48 are also formed by bending so as to be contiguous and integrated with the right and left side walls 42a, 42b and the lower side wall 46. Those flanges 44a, 44b, 48 have through-holes through which the bolts 26a, 26b, and 28 are passed, respectively, so that the flanges 44a, 44b, 48 are integrally fixed to the rear end portion of the rear side member 16 by those bolts 26a, 26b, 28. This bumper stay 14 also has a function of absorbing impact by being deformed (crushed or buckled in a bellows manner) in an axial direction due to application of a load thereto from the bumper reinforcement 40 at the time of rear end collision of the vehicle.

A load transmission member 12 is disposed between the bumper stay 14 and the rear end portion of the rear side member 16. The load transmission member 12 has a protruding portion 60 in a box shape, which is bulged smoothly toward the rear portion of the bumper stay in the longitudinal direction of the vehicle by subjecting a metal plate material such as a steel plate to drawing, or the like. This protruding portion 60 is formed to have a cross section corresponding to the box shape of the bumper stay 14 so that the protruding portion 60 is inserted into the opening of the bumper stay 14 and a side wall 62 of the protruding portion 60 is brought into tight contact with inner faces of the pair of right and left side walls 42a, 42b and the lower side wall 46 of the bumper stay 14. That is, the side wall 62 of the protruding portion 60 is formed in a substantially U-shaped cross section which is perpendicular to the longitudinal direction of the vehicle, so as to be opened on a vehicle upper side. Further, as is apparent from the perspective view of FIG. 3, the side wall 62 has right and left tight-contact side walls 62a, 62b which are brought into tight contact with the inner faces of the right and left side walls 42a, 42b of the bumper stay 14, and a lower-portion tight-contact side wall 62c which is brought into tight contact with the inner face of the lower side wall 46. When the side wall 62 is brought into tight contact with the inner face of the bumper stay 14 as described above, the load transmission member 12 and the bumper stay 14 are reinforced by each other and their deformation is suppressed, so that a larger load is transmitted to the rear side member 16.

Further, around the side wall 62 of the load transmission member 12, a flat one-piece flange 64 which is a continuous flange extending outward from the side wall 62 is formed integrally with the protruding portion 60. The flange 64 functions as a fastened portion. When the bumper stay 14 is fixed to the rear end portion of the rear side member 16 by three bolts 26a, 26b, 28, the flange 64 is fastened between the pair of side flanges 44a, 44b and the lower flange 48 of the bumper stay 14 and the pair of side flanges 22a, 22b and the lower flange 24 provided at the rear end portion of the rear side member 16. Accordingly, the load transmission member 12 is integrally disposed between the bumper stay 14 and the rear side member 16, so that a load input into the bumper stay 14 from the bumper reinforcement 40 at the time of rear end collision of the vehicle is transmitted intensively to a lower side of the rear end portion of the rear side member 16 via the flange 64. As a result, for example, an intermediate portion of the rear side member 16 is buckled and bent in a chevron shape (L-shape) to stick out toward a vehicle upper side, and a predetermined impact absorption effect is obtained by the deformation. The flange 64 has three through-holes 66a, 66b, 68 through which the bolts 26a, 26b, 28 are passed.

The load transmission member 12 may be disposed so as to be sandwiched between the bumper stay 14 and the rear side member 16 at the time of fixing the bumper stay 14 to the rear side member 16, or may be integrally fixed in advance, by spot welding, arc welding, or the like, to the flanges 44a, 44b, 48 of the bumper stay 14 or to the flanges 22a, 22b, 24 of the rear side member 16. In the present embodiment, the load transmission member 12 is fixed to the bumper stay 14 by welding in advance.

Further, the load transmission member 12 has, at a distal end of the protruding portion 60, a distal end face 70 that is substantially parallel to the bottom portion 38 of the bumper stay 14, and a predetermined space is provided between the bottom portion 38 and the distal end face 70. Accordingly, the bumper stay 14 is deformed with a relatively low load from the bottom portion 38 side in the early stage of rear end collision of the vehicle, and after that, a transmitted load is increased when the protruding portion 60 is deformed together with the bumper stay 14. The predetermined space, that is, a distance between the distal end face 70 of the protruding portion 60 and the bottom portion 38 of the bumper stay 14 is determined appropriately such that a desired load-displacement (compression stroke) characteristic is obtained. Note that the distal end face 70 has a through-hole 72 for weight reduction.

In such a bumper-stay mounting structure 10 according to the present embodiment, the protruding portion 60 in the box shape, which sticks out toward the rear portion of the bumper stay in the longitudinal direction of the vehicle, is formed in the load transmission member 12 so as to be inserted in the opening of the bumper stay 14, and therefore, stiffness of the load transmission member 12 itself increases in a load application direction (the longitudinal direction of the vehicle), and the protruding portion 60 is also deformed when the bumper stay 14 is deformed at the time of rear end collision of the vehicle. Therefore, a transmission load is increased by its deformation resistance. Thus, a large load is reliably transmitted to the rear side member 16 via the load transmission member 12 at the time of rear end collision of the vehicle, and an impact absorption effect due to the deformation of the rear side member 16 is obtained appropriately. Further, since the side wall 62 of the protruding portion 60 of the load transmission member 12 has a U-shaped cross section and is opened on the vehicle upper side, the stiffness on the lower side where the continuous side wall 62 is provided is increased in particular. Therefore, a load is transmitted intensively to the lower side of the rear end portion of the rear side member 16, and consequently a desired load transmission state is obtained further reliably.

Further, in the present embodiment, a predetermined space is provided between the distal end face 70 of the protruding portion 60 and the bottom portion 38 of the bumper stay 14, so that the bumper stay 14 is deformed with a relatively low load from the bottom portion 38 side in the early stage of rear end collision of the vehicle, and then, a transmission load is increased when the protruding portion 60 is deformed together with the bumper stay 14. Accordingly, impact is absorbed appropriately by the deformation of the bumper stay 14 for a low load input at the time of low-speed collision or the like, whereas a high load is transmitted appropriately to the rear side member 16 due to deformation resistance of the bumper stay 14 and the protruding portion 60 for a high load input at the time of high-speed collision or the like. Thus, impact is absorbed appropriately due to the deformation of the bumper stay 14, the protruding portion 60, and the rear side member 16.

Further, in the present embodiment, the pair of side flanges 22a, 22b and the lower flange 24 are provided at the rear end portion of the rear side member 16 having a U-shaped cross section, and the bumper stay 14 is fixed to those flanges 22a, 22b, 24 via the load transmission member 12. As a result, a load is transmitted intensively to the lower side of the rear end portion of the rear side member 16, that is, the bottom portion 18 with relatively high stiffness, and thus, a desired load transmission state is obtained further reliably.

Figure 4:
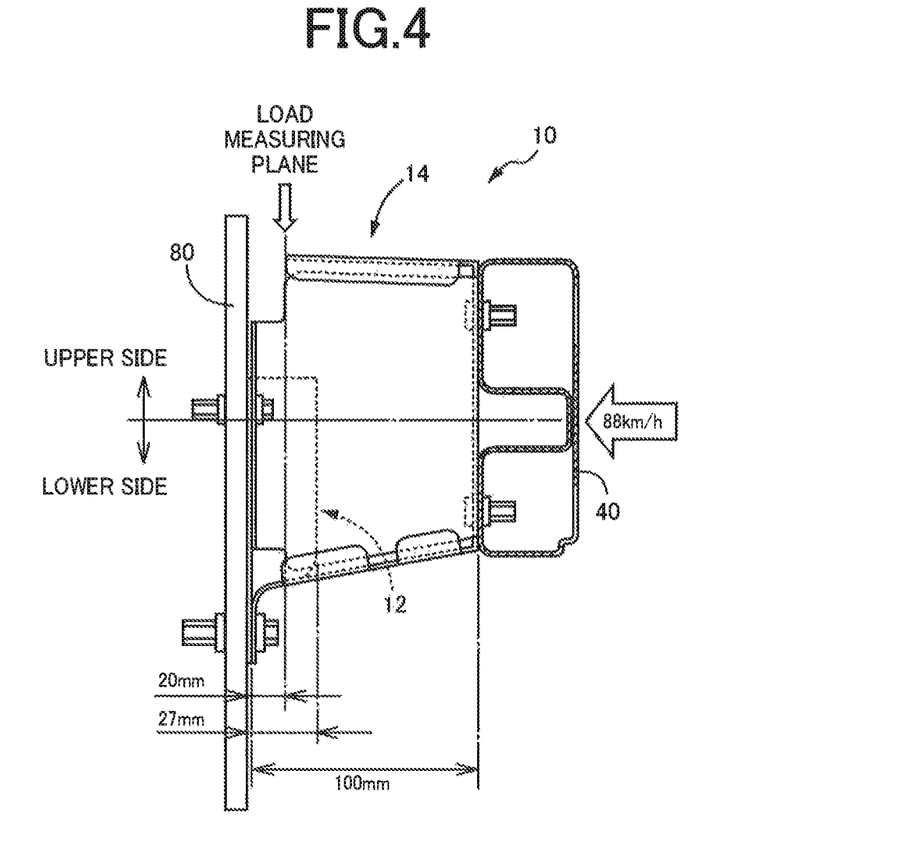
FIG. 4 is a view specifically explaining an analysis condition such as dimensions of each part and a load application speed when examining the bumper-stay mounting structure in the present invention and a load-displacement characteristic in a comparative example by FEM (Finite Element Method) analysis.
Figure 5:
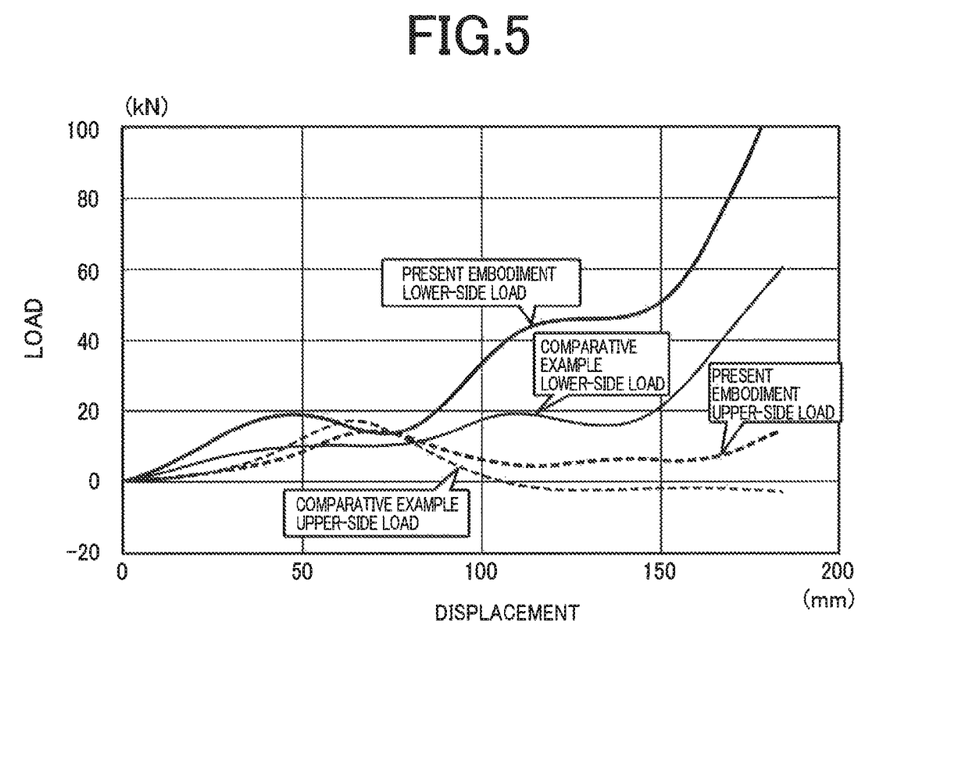
FIG. 5 is a view illustrating one example of the load-displacement characteristic obtained by performing FEM analysis under the analysis condition in FIG. 4.

Note that, in a comparative example in which an intermediate plate 100 in FIG. 6 is used instead of the load transmission member 12 of the bumper-stay mounting structure 10 according to the present embodiment, a load-displacement (compression stroke) characteristic was examined by performing FEM analysis under an analysis condition shown in FIG. 4, and a result shown in FIG. 5 was obtained. Under the analysis condition in FIG. 4, on the assumption that the load transmission member 12 and the bumper stay 14 are fixed to a position-fixed base 80 instead of the rear side member 16, and an impact load is perpendicularly applied at a collision speed of 88 km/h, a load exerting on a bumper stay 14 portion at a load measuring plane apart from a base-fixed surface by 20 mm was examined. An impact load applied on an upper side and an impact load applied on a lower side were examined separately. The load transmission member 12 and the intermediate plate 100 are both high strength steel plates (SCGA440-45 equivalent), and have a plate thickness of 1.8 mm.

As is apparent from the analysis result of FIG. 5, with regard to lower-side loads as shown in continuous lines, the present embodiment (in a bold continuous line) indicates a higher load as a whole than the comparative example (in a thin continuous line), and particularly, at displacements of around 100 mm and over, the load in the present embodiment is significantly higher than that in the comparative example. This is presumably because crush of the protruding portion 60 of the load transmission member 12 started at a displacement of around 100 mm. Further, in both of the present embodiment and the comparative example, the lower-side loads increase remarkably from a displacement of around 140 mm. This is presumably because the bumper reinforcement 40 started to be crushed at this point. On the other hand, with regard to upper-side loads as shown in broken lines, a difference between the present embodiment (in a bold broken line) and the comparative example (in a thin broken line) is not as large as that in the case of the lower-side loads, but at displacements of around 100 mm and over, the load in the present embodiment is higher than that in the comparative example. This is also presumably because of the presence of the protruding portion 60. As described above, the lower-side load in the present embodiment is particularly higher than that in the comparative example. As a result, a load is transmitted intensively to the lower side of the rear end portion of the rear side member 16, and thus, a desired load transmission state is obtained reliably.

The embodiment of the present invention has been described in detail with reference to the drawings as above, but this is merely one embodiment, and the present invention may be implemented in modes obtained by making various changes and modifications based on the knowledge of a person skilled in the art.

BRIEF DESCRIPTION OF REFERENCE NUMERALS

10: bumper-stay mounting structure
12: load transmission member
14: bumper stay
16: rear side member
40: bumper reinforcement
60: protruding portion
62: side wall
64: flange (fastened portion)
70: distal end face

The invention claimed is:

1. A bumper-stay mounting structure, comprising:
a rear side member that is disposed along a longitudinal direction of a vehicle and that absorbs an impact at a time of rear end collision of the vehicle by being deformed in an axial direction due to application of a load to a rear end portion thereof;
a bumper stay that is formed in a bottomed box shape, that has a bottom portion which is located in a rear portion of the bumper stay in the longitudinal direction of the vehicle and to which a bumper reinforcement is attached, and that is provided with, at an outer edge portion of an opening formed in a front portion of the bumper stay in the longitudinal direction of the vehicle opposite to the bottom portion, a pair of side flanges extending outward to a left and a right respectively from a pair of left and right side walls located on both sides in a vehicle width direction and a lower flange extending downward from a lower side wall in a lower portion of the bumper stay in a height direction of the vehicle; and
a load transmission member that is disposed between the rear end portion of the rear side member and the bumper stay, that has a flat fastened portion fastened between the pair of side flanges and the lower flange of the bumper stay and the rear end portion of the rear side member, and that transmits, to the rear side member via the fastened portion, a load input into the bumper stay from the bumper reinforcement at the time of the rear end collision of the vehicle,
in the bumper-stay mounting structure, a load being transmitted intensively to a lower side of the rear end portion of the rear side member,
the bumper-stay mounting structure, wherein
the load transmission member has, on an inner peripheral side of the fastened portion, a protruding portion in a box shape, which protrudes toward the rear portion of the bumper stay in the longitudinal direction of the vehicle so as to be inserted into the opening of the bumper stay; and
a side wall of the protruding portion has a substantially U-shaped cross section that is perpendicular to the longitudinal direction of the vehicle, is opened on a vehicle upper side, and is provided with, at a front end edge of the side wall, a flange extending outward from the side wall as the fastened portion.

2. The bumper-stay mounting structure according to claim 1, wherein
the protruding portion has a distal end face substantially parallel to the bottom portion of the bumper stay, a predetermined space is provided between the bottom portion and the distal end face, so that the bumper stay is deformed with a relatively low load from the bottom portion side in an early stage of the rear end collision of the vehicle, and then a transmission load is increased when the protruding portion is deformed together with the bumper stay.

3. The bumper-stay mounting structure according to claim 1, wherein
the rear side member has a bottom portion and a pair of side walls extending upward respectively from both side portions of the bottom portion so as to form a substantially U-shaped cross section;
the rear end portion of the rear side member is provided with a pair of side flanges extending outward respectively from the pair of side walls in a lateral direction of the vehicle, and a lower flange extending downward from the bottom portion; and
the flange of the load transmission member is fastened between the pair of side flanges and the lower flange of the bumper stay and the pair of side flanges and the lower flange provided at the rear end portion of the rear side member.

4. The bumper-stay mounting structure according to claim 2, wherein
the rear side member has a bottom portion and a pair of side walls extending upward respectively from both side portions of the bottom portion so as to form a substantially U-shaped cross section;
the rear end portion of the rear side member is provided with a pair of side flanges extending outward respectively from the pair of side walls in a lateral direction of the vehicle, and a lower flange extending downward from the bottom portion; and
the flange of the load transmission member is fastened between the pair of side flanges and the lower flange of the bumper stay and the pair of side flanges and the lower flange provided at the rear end portion of the rear side member.

\* \* \* \* \*